April 25, 1933.   G. J. RUSSELL   1,905,506
BROACHING MACHINE
Filed Jan. 30, 1930   2 Sheets-Sheet 1

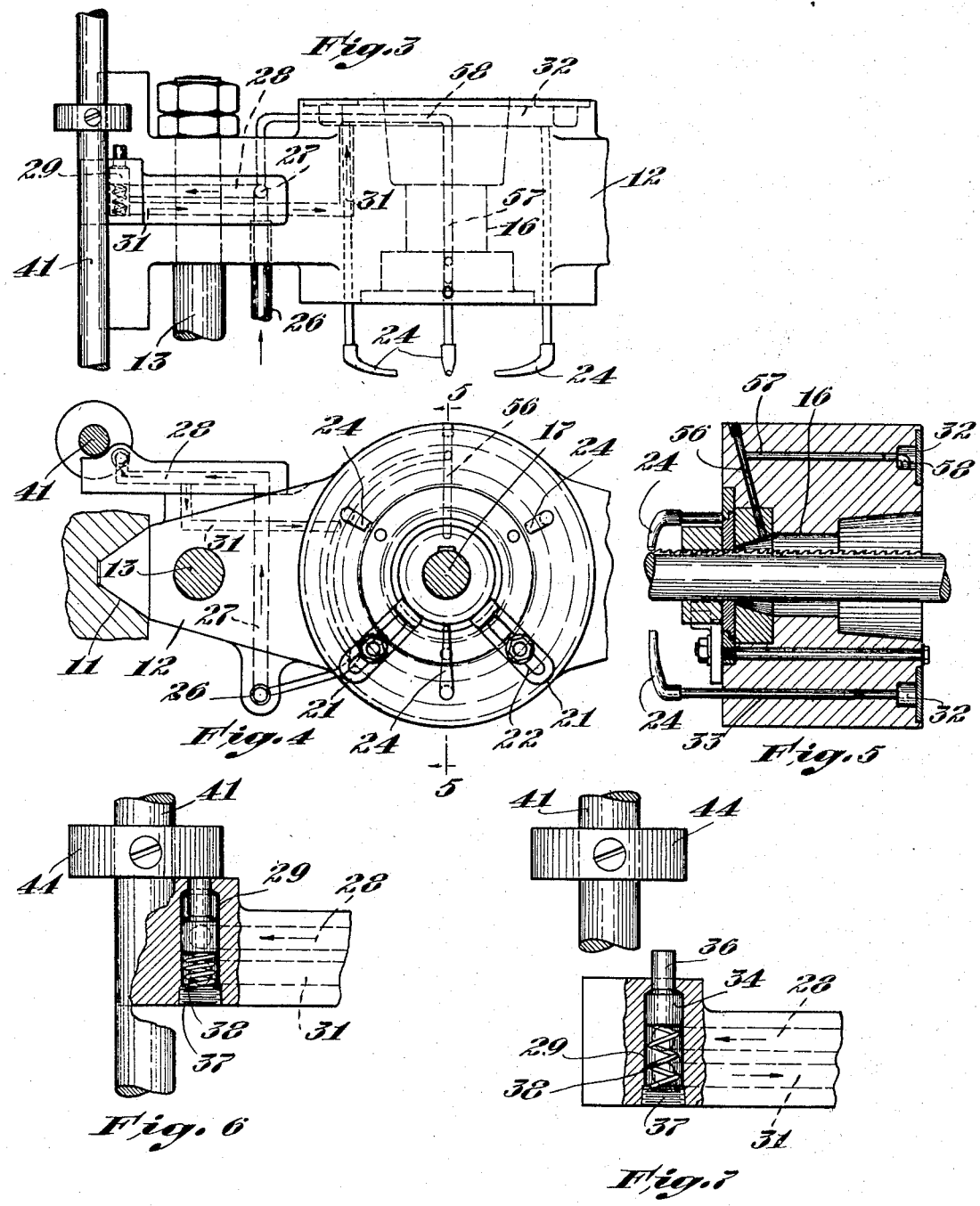

Patented Apr. 25, 1933

1,905,506

UNITED STATES PATENT OFFICE

GEORGE J. RUSSELL, OF WALTHAM, MASSACHUSETTS

BROACHING MACHINE

Application filed January 30, 1930. Serial No. 424,557.

This invention relates to broaching machines, particularly of the type in which the stock to be broached is advanced relative to the broach while the latter remains substantially stationary. In machines of this general class, it is desirable to deliver fluid such as a cooling compound to the broach in advance of the cut being made, and also to provide for washing from the broach fragments or other particles which might otherwise tend to adhere to the broach and thus to interfere with subsequent broaching operations. Relatively large quantities of fluid should be directed upon a broach in advance of the cut being made, while a stream of fluid delivered to the broach immediately after the cut has been effected is of assistance in removing such particles as might otherwise tend to remain. Furthermore, as a comparatively large quantity of fluid is delivered during the broaching operation, it is advantageous to control the flow of this fluid to avoid unnecessary applications thereof.

Objects of the present invention are to provide broaching apparatus of the class described with means for delivering an adequate volume of fluid to the broaching tool in advance of the cut being made; to provide for delivering a stream of fluid to the broaching tool after the latter has effected a cut; to provide for controlling the flow of fluid which is delivered in advance of the cut being made so as to avoid useless applications thereof; and also to provide an improved system for delivering fluid to a broaching tool.

According to the present invention jets may be mounted on the stock carrier or otherwise arranged for distributing fluid to the broach during operation of the apparatus. These jets are disposed for directing fluid upon the broach immediately in advance of a cut as well as at points directly following the cut. Preferably the greater proportion of fluid so delivered is directed to the broach through forwardly disposed jets from which it issues in advance of the cut being made. Flow to the forwardly disposed jets is controlled by a normally open valve which closes upon engagement with an abutment during the return stroke of the stock carrier. In this way the flow is interrupted as the carrier is withdrawn to permit new stock to be introduced into the apparatus and useless applications of compound as well as needless splashing of the same are avoided. A rearwardly directed stream may be permitted to issue from a rearwardly directed jet at all times as such a stream is useful not only in removing particles from the broach but also in washing out the passage in the stock carrier through which the broach operates.

In the drawings:

Fig. 3 is an enlarged plan view of a portion of the carrier shown in Fig. 1, showing the relative arrangement of the valve-operating mechanism;

Fig. 4 is a front elevation of the apparatus shown in Fig. 3, showing a broaching tool in position;

Fig. 5 is a section on the line 5—5 of Fig. 4; and

Figs. 6 and 7 are detail views showing relative arrangements of valve operating mechanism.

Figure 1:
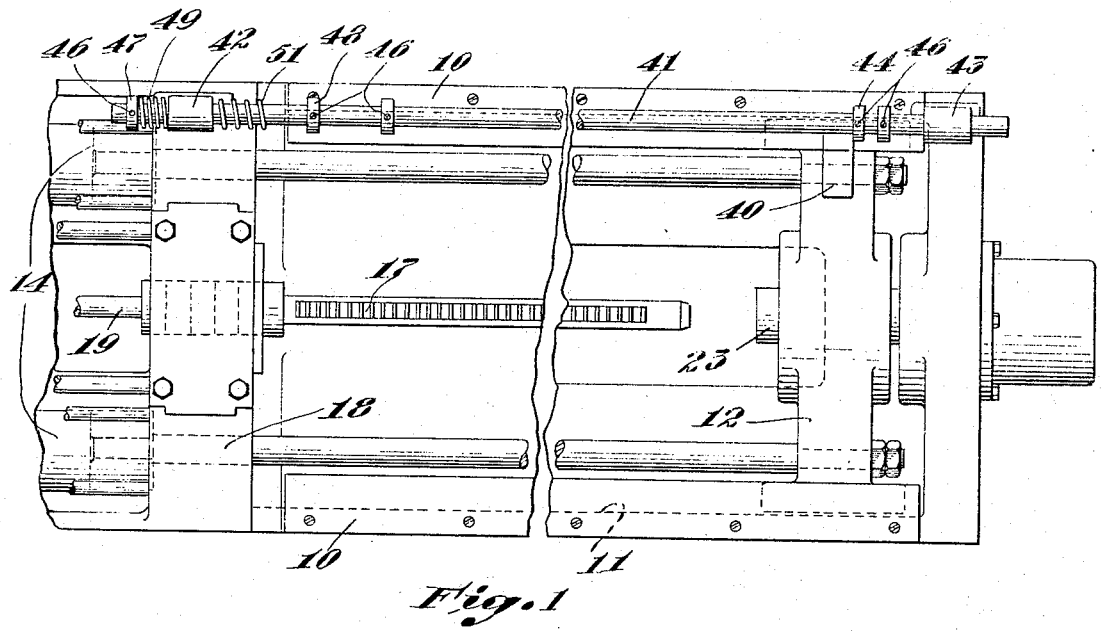
Fig. 1 is a plan view of a portion of a broaching machine.
Figure 2:
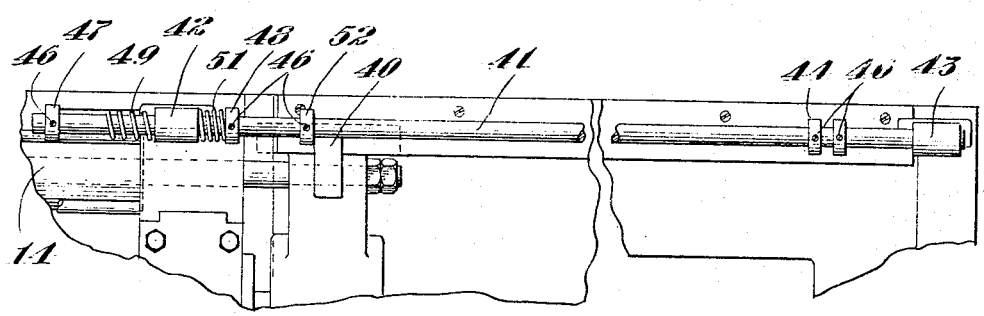
Fig. 2 is a plan view of a portion of the apparatus shown in Fig. 1, showing the parts in different relative positions from those occupied in Fig 1.

The broaching machine selected for illustrative purposes comprises a framework 10 having at the sides thereof longitudinally disposed guideways 11 in which a cross-head or carrier 12 is mounted for reciprocation. This carrier is connected to the rods 13 of pistons (not shown) which work in the cylinders 14, and it will be understood that reciprocation of the cross-head is effected by operating the pistons in the cylinders. The carrier has a centrally disposed longitudinal passage 16 which receives the broach 17 as the carrier is advanced (Fig. 5). The broaching tool is supported in a transverse member 18 carried by the bed plate or frame, preferably in the manner described in detail in my prior Patent No. 1,481,437; and as also disclosed in this prior patent the rear end of the broaching tool is in engagement with an abutment member 19 which is movable, after the broaching operation has been completed, out of engagement with the rear end of the broach to permit removal of broached stock.

The stock to be broached is supported on angle brackets or clips 21 (Fig. 4) bolted to the face of the cross-head, and as the attaching bolts extend through radial slots 22 in the brackets it will be apparent that the latter are thus adjustable radially to receive stock of different diameters. With the parts in the position shown in Fig. 1, the crosshead or stock carrier 12 is in its withdrawn position, and a piece of stock to be broached is indicated at 23. As the carrier is advanced the stock will be forced over the broach 17 in the manner set forth in my afore-mentioned prior patent. During the advance of the carrier it is desirable to deliver a cooling compound or fluid to the broach, preferably in advance of the cut being made. For this purpose a suitable number of jets 24, as for example three, as shown, are mounted in circumferentially spaced relation upon the cross-head and arranged to deliver streams of fluid upon the broaching tool.

As shown more clearly in Figs. 3, 4 and 5, fluid is supplied to these jets through a connection 26 which has vertical and lateral branches 27, 28, as shown in Fig. 4, leading to a valve chamber 29 from which a lateral passage 31 leads to an annular chamber 32 in the rear of the cross-head. Fluid may be conducted from a supply tank or other source of supply through a flexible or sliding connection, or in any other approved manner, to the supply pipe 26. The passages 33 afford direct communication between this annular chamber and the jets 24. The valve chamber 29 is cylindrical in form and contains a piston or plunger 34 having a stem 36 which protrudes from the valve casing. This valve chamber may be closed at one end by a screw plug 37 or in any other approved manner, and a coiled spring 38 is arranged to seat against the plug and against the piston valve to force the valve normally to the end of the chamber, in which position both the lateral branches are afforded communication with the chamber through their respective ports and flow through these lateral passages is permitted.

The stem of the valve protrudes from the housing a sufficient distance so that the valve may be operated to close the port, which affords communication between the lateral passage 28 and the chamber 29 by forcing the stem to a position in which it is flush with the outer surface of the housing. To accomplish this it is of course necessary to overcome the action of the coil spring within the valve chamber. When the valve is operated to close this port, it will be apparent that flow through the jets 24 will be interrupted until such time as the valve is again allowed to move under the influence of the spring 38 to its open position.

Means are provided for automatically closing this valve at definite predetermined points in the stroke of the reciprocating stock carrier. These means comprise the rod 41 which is mounted for longitudinal movement in spaced bearings 42, 43 carried by the frame. This rod carries a collar 44 which is adjustable longitudinally of the rod, as by means of a set screw 46, and this collar is disposed in the path of movement of the valve stem 36, so that the collar may function as an abutment member to force the stem to a position flush with the outer surface of the casing, thereby interrupting the flow through the jets 24.

As the collar is adjustable longitudinally of the rod, it will be apparent that this collar may be set to engage the valve stem at any definite point in the stroke of the carrier and that so long as the collar remains in engagement with the valve stem, the valve will remain closed. In order that this collar may remain in engagement with the valve stem through a definite predetermined portion of the stroke of the stock carrier, the rod is provided with abutments spaced on opposite sides of one of the fixed bearings, as the bearing 42, and these abutments may be in the form of adjustable collars 47, 48 and serve as seats for coil springs 49, 51 which are disposed about the rod and act against the fixed bearing to tend to hold the rod in a definite longitudinal position.

In the position shown in Fig. 1 the carrier is in withdrawn position and the spring 49 has been compressed, while the other spring remains ineffective. As the carrier begins its advance stroke to force the stock over the broach, the spring 49 which is now under compression will act to urge the abutment or collar 44 in engagement with the valve stem to hold the port closed until the stock carrier has begun its advance. As the carrier 12 moves forward the valve 34 will be opened by the action of the spring 38 and fluid will be delivered to the broaching tool.

The fluid is permitted to flow through these jets during the advance and withdrawal of the stock carrier, and it will be observed that during withdrawal of the stock carrier fluid delivered serves to wash fragments or other particles from the broaching tool. As the carrier reaches the forward end of the stroke, the valve housing 40 engages another abutment or collar 52 on the rod 41, and this engagement forces the rod forwardly to compress the rear spring 51 and to allow the forward spring 49 to become extended. This action positively assures that the rod is fully returned to the forward position, where it is ready again to engage the valve stem on withdrawal of the cross-head.

The stock carrier is provided with a vertical passage 56 (Figs. 3–5) which is inclined rearwardly to deliver a rearwardly directed jet or stream upon the broach at points following the cut being made. This inclined vertical passage is supplied from a longitudinal passage 57 connected to a pipe or tube 58 which extends through the annular chamber 32 and is connected to the main supply pipe 26. Fluid is permitted to flow at all times through this rearwardly inclined vertical passage, and the fluid so delivered serves to wash the broach and also the passage 16 in the stock carrier and to remove particles or fragments of metal which otherwise might tend to adhere to these parts.

I claim:

1. Broaching apparatus of the class described, comprising a broach, an abutment engageable with the rear end of the broach, a carrier for advancing stock to be broached, a number of jets on the carrier and directed toward the broach, means for supplying the jets with fluid, means for advancing and withdrawing the carrier, and means effective when the carrier is in withdrawn position for cutting off the supply of fluid from some of the jets without interrupting the supply of fluid to at least one of the jets.

2. Broaching apparatus of the class described, comprising a broach, an abutment engageable with the rear end of the broach, a carrier for advancing stock to be broached, means for advancing and withdrawing the carrier, a number of jets disposed forwardly and rearwardly on the carrier, means for supplying the jets with fluid, and means effective as the carrier is withdrawn for cutting off the supply of fluid to the forwardly disposed jets without interrupting the supply of fluid to at least one of the jets.

3. Broaching apparatus comprising a broaching tool, means for supporting stock during broaching, means for effecting relative movement between the broaching tool and the stock supporting means for broaching stock, means for delivering a given quantity of fluid to the broaching tool during broaching, and means for delivering a smaller quantity of fluid into the stock supporting means after the completion of the broaching operation for washing out the latter means.

4. Broaching apparatus of the class described, comprising a broach, an abutment engageable with the rear end of the broach, a carrier for advancing stock to be broached and having a passage to receive the broach, means for advancing and withdrawing the carrier, a rearwardly directed jet on the carrier for delivering fluid to the broach and for washing out the passage in the carrier, and means for supplying the jet with fluid.

5. Broaching apparatus of the class described, comprising a broach, an abutment engageable with the rear end of the broach, a carrier for advancing stock to be broached, means for reciprocating the carrier between a position to the front of the broach and a position along the cutting portion thereof, means movable with the carrier for delivering fluid to the broach, and means for interrupting the delivery of fluid to the broach while the carrier is in a position to the front thereof.

6. Broaching apparatus of the class described, comprising a carrier for advancing stock to be broached, means for reciprocating the carrier, a number of jets on the carrier, means providing passages on the carrier for conducting fluid to the jets, a valve for controlling the flow to some of the jets, means tending to hold the valve in open position, and an abutment engageable with the valve for closing the latter during a portion of the stroke of the carrier.

7. Broaching apparatus of the class described, comprising a carrier for advancing stock to be broached, means for reciprocating the carrier, a number of jets on the carrier for delivering fluid to a broach, means providing passages on the carrier for conducting fluid to the jets, a valve on the carrier for controlling the flow to some of the jets, means tending to hold the valve in open position, an abutment engageable with the valve for closing the latter during a portion of the stroke of the carrier, and means for guiding the abutment for movement during engagement with the valve.

8. Broaching apparatus of the class described, comprising a carrier for advancing stock to be broached, means for reciprocating the carrier, a number of jets on the carrier for delivering fluid to a broach, means providing passages on the carrier for conducting fluid to the jets, a valve on the carrier for controlling the flow to some of the jets, means tending to hold the valve in open position, an abutment engageable with the valve for closing the latter during a portion of the stroke of the carrier, and means for supporting the abutment in different predetermined positions for closing the valve during different portions of the stroke.

9. Broaching apparatus of the class described, comprising a carrier for advancing stock to be broached, means movable with the carrier for distributing fluid on a broach during movement of the carrier, a valve for controlling the flow of fluid through said fluid distributing means, a rod, means for supporting the rod for longitudinal movement, and an abutment on the rod and engageable with the valve for closing the latter during a portion of the movement of the carrier.

10. The combination as set forth in claim 9, and means tending to hold the rod in a definite position in its supporting means.

11. Broaching apparatus of the class described, comprising a carrier for advancing stock to be broached, means for reciprocating the carrier, the carrier having an annular chamber therein, a passage for conducting fluid thereto and other passages for conducting fluid from the chamber to a broaching tool during movement of the carrier, a valve interposed in the first-mentioned passage, and means for closing the valve during a portion of the stroke of the carrier.

12. Broaching apparatus of the class described, comprising a carrier for advancing stock to be broached, means for reciprocating the carrier, the carrier having an annular chamber therein, a passage for conducting fluid thereto and other passages for conducting fluid from the chamber to a broaching tool in advance of a cut being made, and means for interrupting the flow through said first-named passage during a portion of the stroke of the carrier.

13. Broaching apparatus of the class described, comprising a carrier for advancing stock to be broached, means for reciprocating the carrier, the carrier having an annular chamber therein, a passage for conducting fluid thereto and other passages for conducting fluid from the chamber to a broaching tool in advance of a cut being made, means for interrupting the flow through the first-named passage during a portion of the stroke of the carrier, and another passage for delivering fluid to a broach during the advance of the carrier and after a cut has been made.

14. The combination as set forth in claim 13, wherein said other passage is arranged to deliver a rearwardly directed stream to the broach for removing particles therefrom.

15. Broaching apparatus of the class described, comprising a carrier for advancing stock to be broached, means movable with the carrier for delivering fluid to the broach, during the broaching operation, at points in advance of and following the stock, and means for cutting off the flow of fluid to points in advance of the stock during a portion of the movement of the carrier.

16. Broaching apparatus comprising a broaching tool, means for supporting stock during broaching, means for effecting relative movement between the broaching tool and the stock supporting means for broaching stock, means for delivering a given quantity of fluid to the broaching tool during broaching, and means effective during the relative movement and after the completion of the broaching operation for delivering a smaller quantity of fluid onto the broaching tool for washing away chips.

17. Broaching apparatus comprising a broaching tool, means for supporting stock during broaching, means for effecting relative movement between the broaching tool and the stock supporting means for broaching stock and for restoring these parts substantially to their initial positions, means for delivering fluid in at least one stream directed onto the tool in advance of a cut being made during the broaching operation, means for discontinuing the flow of this stream after the completion of the broaching operation and during the relative movement which is effective for restoring the parts substantially to their initial position, and means for delivering fluid in at least one stream directed onto the broaching tool at points following a cut being made during broaching, the latter means being effective for continuing the latter stream during that portion of the relative movement which is effective for restoring the parts substantially to their initial positions.

18. Broaching apparatus of the class described comprising a broach, an abutment engageable with the rear end of the broach, a carrier for advancing stock to be broached, means for reciprocating the carrier along the broach for effecting the broaching operation, means providing lubricating ducts within the carrier and directed toward the broach, and a source of lubricant to supply said ducts.

Signed by me at Boston, Massachusetts, this twenty-seventh day of January, 1930.

GEORGE J. RUSSELL.